May 14, 1963 G. D. BRADLEY 3,089,737
BEARING ASSEMBLY
Filed Nov. 25, 1960 2 Sheets-Sheet 1

INVENTOR.
GUY D. BRADLEY
BY Robert H. Montgomery
ATTORNEY

May 14, 1963  G. D. BRADLEY  3,089,737
BEARING ASSEMBLY

Filed Nov. 25, 1960  2 Sheets-Sheet 2

INVENTOR.
GUY D. BRADLEY
BY Robert H. Montgomery
ATTORNEY

United States Patent Office 3,089,737
Patented May 14, 1963

3,089,737
BEARING ASSEMBLY
Guy D. Bradley, Erie, Pa., assignor to General Electric Company, a corporation of New York
Filed Nov. 25, 1960, Ser. No. 71,789
16 Claims. (Cl. 308—187)

This invention relates to bearing assemblies and lubrication thereof, and more particularly relates to lubrication of antifriction bearings wherein the outer race rotates, and to an arrangement for securing a rotating outer race to its mount.

Antifriction bearings may be classified in one manner as oil-lubricated or grease-lubricated. However, in the great majority of installations, grease is used as the lubricant for several reasons, one of which is simplicity of bearing assembly construction which contributes to economy. The grease per se is not the bearing lubricant, but is a vehicle for oil contained therein which provides lubrication for the bearings. When the oil content of the grease decreases below a given percentage, depending on the quantity of oil in the original product, the lubricating value of the grease is essentially lost.

In antifriction bearing assemblies where the outer race rotates, grease, due to centrifugal force, forms in an annular layer on the surface of the wall defining the outer race seat. In most cases, conventional bearing sealing means are grease-tight but not oil-tight, and at high speeds of rotation the oil will be centrifuged out of the grease and out of the bearing cavity around conventional sealing means, or even through the bearing, if of the open type. It has been found also that bearing assemblies of the so-called sealed type, having annular members affixed to one race and having sliding contact with the other, do not retain the lubricating oil therein for periods of prolonged operation at high speeds due to the action of centrifugal force which establishes a pressure head on the oil to eventually force oil past the sealing means. To prevent this seal leakage, various means have been taken with limited success. When the oil is centrifuged out of the grease and bearing, or bearing lubricant cavity, the bearing will run dry and suffer permanent damage unless the loss of lubricant is detected and supplemental lubricant is added.

Where some bearing installations are easily accessible to periodic inspection, or where small amounts of lubricant can be added periodically, no significant problem is presented. However, some installations are not accessible without dismantling the members or apparatus supported or aligned by the bearing. The aforementioned difficulties in lubrication of bearings with rotating outer races is particularly pronounced in the case of pilot bearings axially aligning two rotating shafts. This type of construction may be found in variable speed eddy current coupling drives wherein the pilot bearing is for all practical purposes inaccessible without dismantling the apparatus. Such an apparatus may take the form shown in FIG. 1 of the drawings, wherein a driving motor and an eddy current coupling are commonly housed, the motor shaft drives an eddy current drum, which through magnetic interaction with a rotating field assembly mounted on an output shaft and a stationary field member produces a driving torque on the output shaft. To achieve proper air gaps and clearances between the members, the input and output shafts must be aligned and a pilot bearing is utilized for both aligning the shafts and supporting an end of the output shaft. It may be seen that the pilot bearing is deep within the confines of the coupling apparatus and inaccessible for routine lubrication inspection. In such an installation, it is imperative that adequate means be provided for maintaining lubrication of the bearing over a long period of time. It would not be economically feasible to periodically dismantle the apparatus only to inspect and relubricate the pilot bearing.

Additionally, in such apparatus only a sliding fit is normally obtainable between the bearing outer race and its seat because of the necessity of making a "blind" assembly between the outer race and its housing, as hereinafter described. Therefore, some physical play may result therebetween, allowing the outer race to depart from the vertical plane of the bearing assembly which results in eccentricity of the outer race and the rotating member supported and/or aligned thereby, and also causes fretting corrosion of the outer race and the member providing the seat therefor. In such installations another ever-present problem is creepage or slipping of the outer race with respect to its seat.

Therefore, among the objects of this invention are the provisions of an improved lubricant-retaining bearing arrangement wherein the outer race rotates; an improved pilot bearing lubrication arrangement; a bearing assembly structure which facilitates assembly and alignment of coaxial rotating shafts aligned and positioned by a pilot bearing; and a pilot bearing construction which eliminates or greatly minimizes any tendency toward eccentricity of the coaxial shafts and relative rotation of the outer race and its seat.

Briefly stated, these and other objects of my invention are achieved in one form thereof by providing a bearing-retaining cartridge or housing about the outer race of a bearing assembly having its inner race affixed to a first shaft and inserting the cartridge within receiving means associated with a second shaft whereby the shafts are axially aligned and supported at the ends thereof. Lubricant-sealing means may be provided surrounding the outer periphery of the cartridge and together with the cartridge-receiving means of the second shaft, provide an oil seal which prevents leakage of oil about the cartridge. Also, the cartridge may be so dimensioned as to decrease tendencies toward eccentricity of the shafts and relative rotation with the cartridge-receiving means.

The features of the invention which are believed to be novel are set forth with particularity in the appended claims. The invention itself, both as to its organization and mode of operation, together with further objects and advantages thereof, may best be understood by referring to the following description taken in connection with the following drawings wherein:

Figures 1, 2:
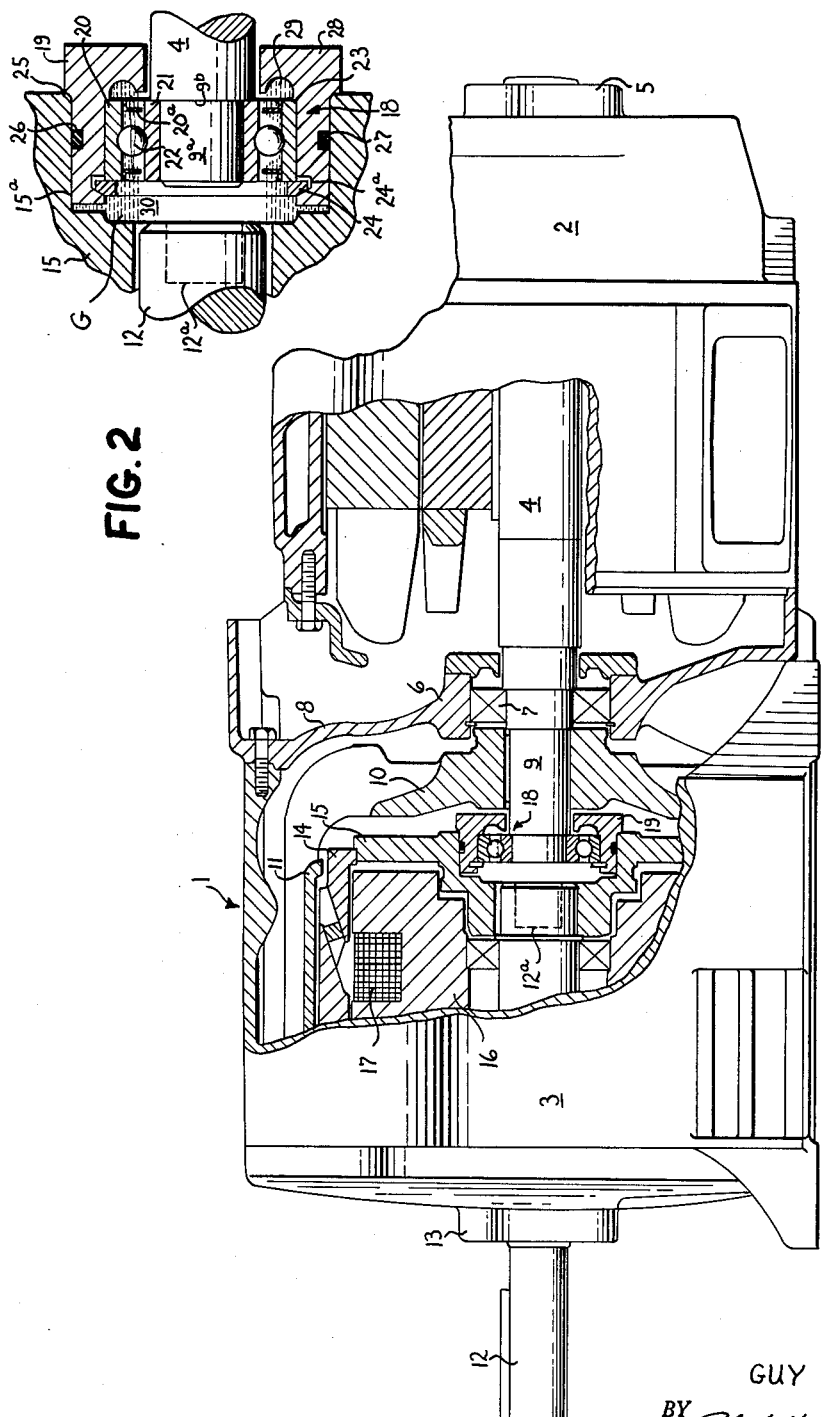
FIGURE 1 illustrates my invention embodied in an eddy current coupling drive unit shown partially in section.
FIGURE 2 illustrates an enlarged sectional view of the embodiment of the invention shown in FIGURE 1.

Reference is now made to FIGS. 1 and 2 where I show an eddy current coupling drive 1 which comprises a motor 2 and an eddy current coupling 3. Motor shaft 4 is journaled in bearing bracket 5 by bearing means, not shown, at one end thereof and in bearing bracket 6 by means of bearing 7 towards the opposite end thereof. The eddy current coupling in which my invention is illustrated is disclosed and claimed in the copending applications of Charles M. Wheeler and Philip M. Folger, Serial No. 822,947, filed June 25, 1959, and Serial No. 14,817, filed March 14, 1960, now U.S. Patent No. 3,020,-

427 both assigned to the same assignee as the present invention.

The first-mentioned copending application discloses and claims an eddy current coupling structure and bearing arrangement, while U.S. Patent No. 3,020,427 discloses and claims the housing structure including housing adapter 8 which provides bearing bracket 6.

Mounted on portion 9 of shaft 4 is the hub 10 of an eddy current drum 11 which is driven by the motor shaft 4. The eddy current coupling output shaft 12 is journaled in bearing bracket 13 by bearing means, not shown, and has a rotatable member, such as pole assembly 14, affixed thereto on hub 15. A stationary magnetic core member 16 is concentrically mounted on shaft 12 and has a field excitation winding 17 thereon. Means, not shown, are provided for securing the core member 16 to the eddy current coupling housing to prevent rotation of the core member.

When the eddy current drum 11 is driven by the motor, and the field winding 17 is excited, the interdigitated pole assembly has a torque produced thereon which causes output shaft 12 to be driven. Further description of the structure and operation of the illustrated eddy current coupling may be had by reference to the aforementioned copending application, Serial No. 822,947. It will be noted that the output shaft 12 and motor shaft 4 are coaxially aligned by means of a pilot bearing 18 deep within the confines of the coupling 3.

In accordance with this invention, I provide means for facilitating blind assembly and alignment of shafts 12 and 4, which prevents relative rotation of the outer race of bearing assembly 18 and hub 15, and means for providing and retaining bearing lubricant for pilot bearing assembly 18. As most clearly seen in FIG. 2, an annular lubricant-retaining housing member or cartridge 19 is provided about the outer race of antifriction bearing assembly 18 which comprises outer race 20, inner race 21 and bearing elements 22 therebetween. The outer race 20 is locked in the cartridge 19 against shoulder 23 by a tapered snap ring 24 inserted in a groove 24a in the inner periphery of the cartridge adjacent the outer race 20 to exert an axial force on outer race 20 towards shoulder 23. The inner race 21 is then preferably shrunk or pressed on portion 9a of shaft 4 and axially positioned thereon by means of shoulder 9b. The cartridge 19 will be noted to have a shoulder 25 thereon which axially positions the cartridge in a cartridge receiving means provided in the hub 15 of the pole assembly 14. A groove 26 is defined in the outer periphery of the cartridge member 19 which mates with annular surface 15a of hub 15. A resilient O-ring seal 27 having a cross-sectional diameter larger than the depth of the groove 26 is positioned in the groove 26 and when the cartridge 19 is assembled in the hub 15, the O-ring seal 27 prevents oil from being centrifuged from the grease between the mating surfaces of the outer periphery of the cartridge and surface 15a of hub 15. It will also be noted that cartridge 19 has radially inwardly extending annular portion 28 with an annular recess 29 provided therein to contribute to definition of a lubricant-retaining cavity 30 about the bearing assembly. Hub portion 15 and shaft 12 also contribute to definition of the lubricant-retaining cavity.

In accordance with one aspect of my invention, the axial length of the mating surfaces of the outer periphery of the cartridge and surface 15a is made greater than the axial dimension of the outer race for reasons hereinafter explained. To facilitate in the assembly of the shaft 12 to shaft 4, I may provide a chamfer (not clearly shown in FIGS. 1 and 2, but indicated by numeral 31 in FIG. 3) on the cartridge-receiving portion of hub 15 to faciltate the blind assembly of the hub 15 to shaft 4.

Assembly is made by locking outer race 20 within the cartridge 19, by means of shoulder 23 and tapered snap ring 24, as previously explained. In the alternative, depending on the amount of bearing element clearance between the races, the outer race may have a press or shrink fit within the cartridge 19. The bearing inner race 21 is then shrunk or pressed on portion 9 of shaft 4 after hub 10 has been mounted on the shaft. In this assembly, it is important to note that both the outer race 20 and inner race 21 are non-rotatively secured with cartridge 19 and shaft portion 9a respectively. With this method of assembly, no force is transmitted through the bearing elements 22 which would tend to Brinell the races. The shaft 12, with the core 16 and member 14 mounted thereon, are then axially moved into engagement with cartridge 19 so that hub 15 of field member 14 receives the cartridge 19 therein, as illustrated. It will be apparent that by providing a chamfer on the surface 15a, the blind assembly of the shafts, and hence the motor and eddy current coupling, is facilitated. It is preferred to make this assembly by vertically lowering the shaft 12 with hub 15 thereon onto the cartridge 19. Inasmuch as the tolerance between the diameter of the outer periphery of cartridge 19 and the diameter of surface 15a is only a few ten thousandths (preferably less than 0.0008") it may, dependent on the weight of the assembly on shaft 12, be necessary to apply additional force to position hub 15 over cartridge 19. If desired, the outer peripheral surface of the cartridge 19 and the surface 15a may be complementary tapered to facilitate assembly.

In view of this blind assembly, it will be seen that a relatively loose fit (sliding as opposed to interference) is provided between the outer periphery of the cartridge 19 and surface 15a. Because of this, I make the axial dimension of contact of these surfaces a dimension greater than would be the length of contact if the cartridge 19 were not provided (greater than the axial dimension of outer race 20) between outer race 20 and surface 15a. However, it is to be realized that this fit is no looser than if the cartridge 19 were not provided. Increasing this dimension of contact decreases the possible degree of eccentricity between the relatively rotatable shafts 4 and 12 and eliminates the problem of fretting corrosion due to outer race 20 turning in the hub 15, which frequently occurred in prior art pilot bearing applications. By providing the locked bearing fit between the outer race and the much larger load bearing surface of the outer periphery of the cartridge, fretting of ball bearings is essentially eliminated. Furthermore, increasing the area of contact of the outer race and surface 15a by providing cartridge 19 provides a greater frictional force against relative rotation of outer race 20 and cartridge 19 with respect to hub 15.

Prior to the assembly of the shafts 4 and 12, oil-containing lubricant, grease, is packed in cavity 30 in the desired quantity, and upon assembly and rotation of shaft 12, it will be seen that the grease G is contained within cavity 30 and forms annular layers therein. Additional grease may be stored in cored portion 12a of shaft 12. Upon rotation of shaft 4 and resulting rotation of the pole assembly 14, and rotation of the outer race 20 and cartridge 19 therewith, the grease is subjected to centrifugal forces which tend to form the grease in annular layers on outer peripheral surfaces within the cavity 30. The centrifugal forces exerted will attempt to cause oil from the grease to be forced between the cartridge 19 and surface 15a; however, compressed seal 27 seals this possible passage to prevent escape of oil. Portion 28 of cartridge 19 prevents centrifugal escape of oil on the opposite side of the bearing assembly 18. As illustrated, I may use a bearing assembly of the shielded type having annular shields 20a to block grease from entrance between the races 20 and 21 to minimize churning of grease therein. The shields 20a are shown for illustrative purpose only, and do not denote actual structural configurations of a shielded type bearing. The provision of a shielded bearing assembly as illustrated is deemed necessary only in installations where rotative speeds are of such magnitude that an over-supply of grease between the races would cause undesired temperature rises. In many installations an open type bearing will be satisfactory. As shown in FIG. 2, the grease forms annularly in the cavity 30 upon rotation of housing member, or cartridge, 19 and the grease adjacent bearing elements 22 tends to also form in an annular layer on the outer race. However, movement of the bearings between the races throws the grease outwardly from the bearing elements. As the shaft 12 is caused to rotate, an equilibrium condition will be established.

Where my invention is embodied in an eddy current coupling, as illustrated in FIG. 1, it provides an additional advantage which will be readily apparent to one skilled in the art. In eddy current devices, it is highly desirable to eliminate magnetic flux leakage paths; therefore, in embodiments such as those shown in FIG. 1, I may construct the cartridge member 19 of suitable non-magnetic material such as stainless steel to prevent flux leakage through the bearing assembly 18 into the shaft 4.

Figure 3:
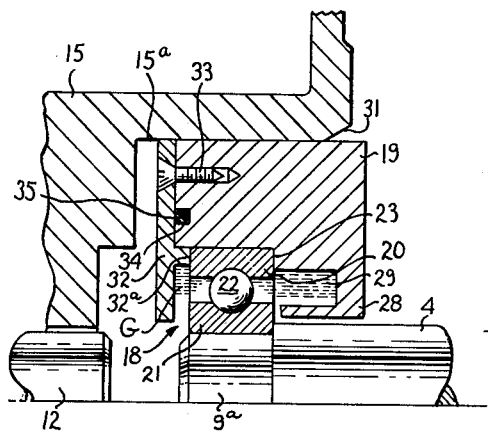
FIGURE 3 illustrates a second embodiment of the invention.
Figure 4:
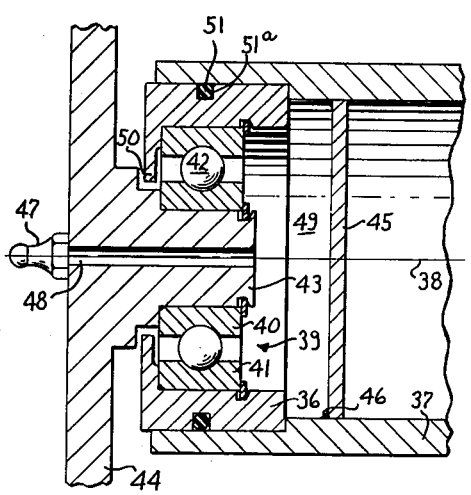
FIGURE 4 represents an embodiment of the invention wherein the outer race rotates and the inner race is stationary.
Figure 5:
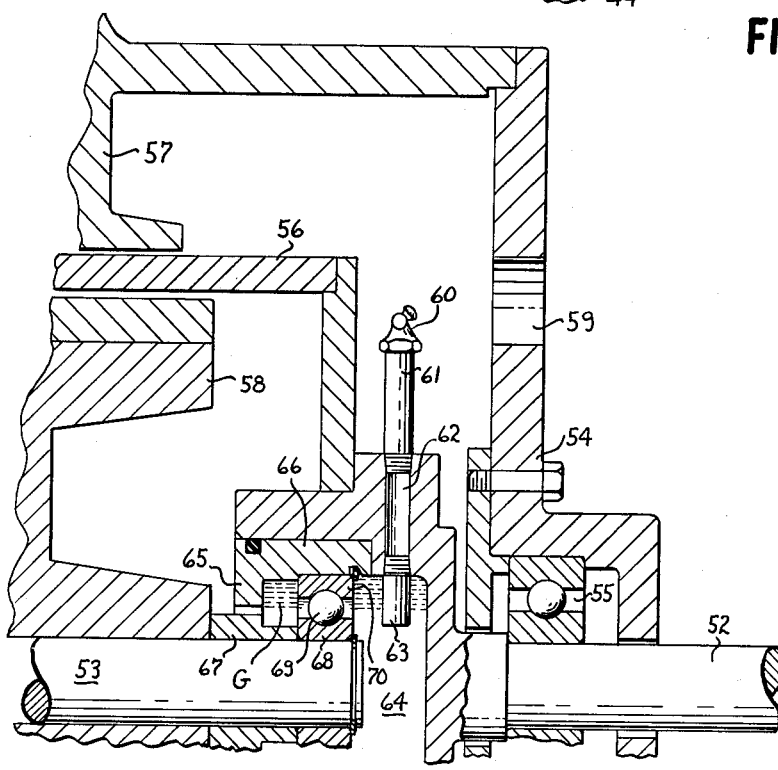
FIGURE 5 illustrates the invention embodied in an eddy current coupling wherein means are provided for relubrication.

In FIGS. 3, 4 and 5 I show other structures in which my invention may be embodied. In FIG. 3, wherein like identifying numerals as used in FIGS. 1 and 2 identify like elements with respect to FIGS. 1 and 2, a modification of the construction illustrated in FIGS. 1 and 2 is shown. The cartridge 19 is seated within hub 15 mounted on shaft 12. Chamfer 31 is provided on the internal annular surface of hub 15 to facilitate assembly of cartridge 19 and member 15. In this embodiment, the bearing and lubricant-retaining cavity is defined by closure member 32 which also aids in securing outer race 20 axially within the cartridge 19 by means of projection 32a. In this embodiment the projection 32a, together with shoulder 23 exert a compressive force on outer race 20 to lock cartridge 19 and outer race 20 against relative rotation. The closure member 32 may be secured to cartridge member 19 by means of threaded bolts or screws 33, as illustrated. In the embodiment shown in FIG. 3, the lubricant-sealing means comprises an annular groove 34 in the radial surface of the cartridge and an O-ring seal 35 compressed therein by the closure member 32. The oil seal may also be accomplished by flat gasketing material between the mating surfaces of member 32 and cartridge 19, or an O-ring might be positioned in a groove in cartridge 19, as illustrated in FIGS. 1 and 2. Again it will be noted here that the axial dimension of the mating surfaces of cartridge 19 is greater than the axial dimension of outer race 20. In the embodiment of FIG. 3, the cartridge 19 including portion 28, together with closure member 32, form a self-contained lubricant-retaining cavity into which the desired quantity of grease is packed before assembly. Either an open or shielded type bearing assembly may be used.

In FIG. 4 I illustrate an embodiment of the invention wherein the outer race rotates and the inner race of a bearing assembly is stationary. In FIG. 4 a bearing adapter or cartridge 36 is provided within a hollow shaft 37 which is rotatable about the axis 38. Hollow shafts are often used in rotating apparatus to increase the stiffness of the rotating shaft while reducing the weight thereof. Bearing assembly 39 comprising inner race 40, outer race 41 and bearing elements 42 therebetween, has the inner race 40 suitably mounted as by shrinking or pressing on portion 43 of stationary frame member 44. A bearing and lubrication cavity defining member 45 is provided within the hollow shaft as by welding at 46. In this embodiment, it may be seen that provision is made for applying lubricant to the bearing cavity through grease fitting 47 and channel 48 into the cavity 49. Also, it may be seen that the radially inwardly extending portion 50 of cartridge 36 may be so dimensioned as to determine the grease level within the cavity. If the cavity 49 is over-supplied, grease will be centrifuged out through the bearing over portion 50 of cartridge 36 to regulate the lubricant level within the cavity 49. It will be apparent that the oil carried by the grease will not be thrown out inasmuch as it will be centrifuged towards the outer surface of the cavity 49. As in the structures shown in FIGS. 1 and 2, I provide a resilient oil sealing means 51 between the outer peripheral surface of the cartridge 36 and the mating surface of hollow shaft 37 in groove 51a.

In FIG. 5 I show the invention embodied in an eddy current dynamometer having an input shaft 52 and an output shaft 53, both of which rotate, and provide in this structure a relubricating arrangement. The input shaft 52 is journaled in end frame 54 by means of bearing assembly 55. The shaft 52 drives an eddy current drum 56 which coacts with a magnetic field assembly 57 to drive a rotor member 58 mounted on output shaft 53. This structure is similar in many respects to that shown in FIG. 1. However, inasmuch as the dynamometer shown is a free-standing machine, access may be provided into the bearing cavity by provision of ports 59 in end frame member 54 to a greasing nipple 60 which communicates through a tube 61, channel 62 and standpipe 63 with the bearing and lubricant-retaining cavity 64. It may be seen that new grease may be introduced into the cavity 64 by this arrangement, and the radially extending portion 65 of cartridge 66 may be dimensioned to regulate the grease level within the cavity 64. In this embodiment I provide inner race positioning member 67 on shaft 53 to axially position inner race 68 of bearing assembly 69. The outer race 70 may be secured in the cartridget 65 in a manner heretofore explained.

It may be seen that the standpipe 63 extends beyond the regulated grease level determined by portion 65; therefore, no oil will be centrifuged out of the cavity through the re-greasing arrangement. For reasons heretofore mentioned, in the structure of FIG. 5, the cartridge 66 may be made of non-magnetic material.

The illustrated embodiments of the invention have been selected for purposes of illustration, and it will be apparent that my invention may find application in many bearing arrangements wherein the outer shaft rotates. Other modifications and embodiments of the disclosed invention may occur to those skilled in the art which do not depart from the spirit and scope of this invention. Accordingly, it is intended to cover all modifications of the invention and changes in the illustrated assemblies of the invention herein chosen for purposes of disclosure which do not constitute departures from the spirit and scope of the invention.

What I claim as new and desire to secure by Letters Patent of the United States is:

1. An arrangement for providing a lubricant-retaining cavity about and a seat for a bearing assembly comprising an inner race, an outer race and bearing elements therebetween, a rotatable member arranged to be carried on said outer race whereby the outer race rotates about the axis of the bearing assembly, a housing member having an annular portion extending axially with respect to the axis of said bearing assembly, said outer race being non-rotatively secured within the annular portion of said housing member, said inner race being secured on a mounting member, said housing member being fitted into housing-receiving means provided by said rotatable member so that said rotatable member and said outer race have no relative rotation, annular sealing means between said receiving means and said housing member for blocking passage of bearing lubricant therethrough, said housing member having an annular portion extending radially inwardly beyond said outer race and together with said receiving means defining an annular lubricant retaining cavity about said bearing to prevent centrifuging of bearing lubricant therefrom upon rotation of said rotatable member.

2. An arrangement for providing a lubricant-retaining cavity about and a seat for a bearing assembly comprising an inner race, an outer race and bearing elements therebetween, a rotatable member arranged to be carried on said outer race whereby the outer race rotates about the axis of the bearing assembly, a housing member having an annular portion extending axially with respect to the axis of said bearing assembly and an annular portion extending radially inwardly beyond said outer race, said outer race being non-rotatively secured within the annular portion of said housing member, said inner race being secured on a non-rotative mounting member, said housing member being fitted into housing-receiving means provided by said rotatable member so that said rotatable member and said outer race have no relative rotation, sealing means between said housing member and said housing receiving means to prevent centrifuging of lubricant therebetween upon rotation of said outer race, said housing member and said housing receiving means defining a lubricant-retaining cavity about said bearing assembly to prevent loss of lubricant therefrom upon rotation of said rotatable member.

3. An arrangement for providing a lubricant-retaining cavity about and a seat for a bearing assembly comprising an inner race, an outer race and bearing elements therebetween, a rotatable member arranged to be carried on said outer race whereby the outer race rotates about the axis of the bearing assembly, a housing member having an annular portion extending axially with respect to the axis of said bearing assembly and an annular portion extending radially inwardly beyond said outer race, said outer race being non-rotatively secured within the annular portion of said housing member, said inner race being secured on a non-rotative mounting member, said housing member being fitted into housing-receiving means provided by said rotatable member whereby said rotatable member and said outer race have no relative rotation, sealing means between said housing member and said receiving means therefor to prevent centrifuging of lubricant therebetween upon rotation of said outer race, said housing member and said receiving means defining a lubricant-retaining cavity about said bearing assembly to prevent loss of lubricant therefrom upon rotation of said rotatable member, said inwardly extending portion of said housing member being radially dimensioned to predetermine the quantity of lubricant in the cavity upon rotation of said rotatable member and channel means defined in said inner race mounting means for introducing lubricant into the cavity.

4. An arrangement for providing a lubricant-retaining cavity about and mounting means for a bearing assembly axially aligning relatively rotatable shafts comprising an inner race, an outer race and bearing elements therebetween, a first shaft arranged to be carried on said outer race, a housing member having an annular portion extending axially with respect to the axis of said bearing assembly and a portion extending radially inwardly beyond said outer race and defining an aperture therein for passage of a second shaft therethrough, said outer race being non-rotatively secured within the annular portion of said housing member, said inner race being secured on said second shaft within said housing member, said housing member being fitted into housing-receiving means provided by said first shaft so that said first shaft and said outer race have no relative rotation, means for preventing centrifuging of lubricant between said housing member and said receiving means, said housing member and said housing receiving means defining a lubricant-retaining cavity about said bearing assembly to prevent loss of lubricant therefrom upon rotation of said first shaft.

5. An eddy current coupling having relatively rotatable axially aligned shafts, bearing means comprising an inner race, an outer race and bearing elements therebetween aligning said shafts, a bearing housing member having an annular portion extending axially with respect to said shafts and a radial portion with an opening defined therein to allow passage of one of said shafts therethrough, said outer race being non-rotatively secured within said annular portion of said housing member, said inner race being mounted on the end of one of said shafts within said housing member, said housing member being fitted within receiving means provided by the other of said shafts to axially align said shafts, resilient sealing means interposed between said receiving means and said housing member, said radial portion extending inwardly beyond said outer race, said receiving means and said housing member defining a bearing lubricant-retaining cavity about said bearing means to prevent centrifuging of bearing lubricant therefrom upon rotation of said other of said shafts.

6. An eddy current coupling having relatively rotatable axially aligned shafts, one of said shafts being supported at one end thereof on the other, bearing means comprising an inner race, an outer race and bearing elements therebetween aligning said shafts, a bearing housing member having an annular portion extending axially with respect to said shafts and a radial portion with an opening defined therein to allow passage of one of said shafts therethrough, said outer race being non-rotatively secured within said annular portion of said housing member, said inner race being mounted on the end of one of said shafts within said housing member, said housing member being fitted within receiving means provided by the other of said shafts to axially align said shafts, said radial portion extending inwardly beyond said outer race, said receiving means and said housing member defining a bearing lubricant-retaining cavity to prevent centrifuging of bearing lubricant therefrom upon rotation of said driven shaft, and means for preventing bearing lubricant from centrifuging between said housing member and said receiving means upon rotation of said other of said shafts.

7. An eddy current coupling having relatively rotatable axially aligned shafts, one of said shafts being supported at one end thereof on the other, bearing means comprising an inner race, an outer race and bearing elements therebetween aligning said shafts, a bearing housing member having an annular portion extending axially with respect to said shafts and a radial portion with an opening defined therein to allow passage of one of said shafts therethrough, said outer race being non-rotatively secured within said annular portion of said housing member, said inner race having an interference fit on the end of one of said shafts within said housing member, said housing member being fitted within receiving means provided by the other of said shafts to axially align said shafts, resilient sealing means interposed between said receiving means and said housing member to prevent passage of lubricant therethrough upon rotation of said other shaft, said radial portion extending inwardly beyond said outer race, said receiving means and said housing member defining a bearing lubricant retaining cavity about said bearing means to prevent centrifuging of bearing lubricant therefrom upon rotation of said driven shaft.

8. An eddy current coupling having relatively rotatable axially aligned shafts, one of said shafts being an extension of a motor shaft in a housing common with said coupling, the other of said shafts having mounted thereon an eddy current member having a hub portion and an annular portion overhanging said shaft, bearing means comprising an inner race, an outer race and bearing elements therebetween aligning said shafts, a bearing housing member having an annular portion extending axially with respect to said shafts and a radial portion with an opening defined therein to allow passage of one of said shafts therethrough, said outer race being non-rotatively mounted within said annular portion of said housing member, said inner race being mounted on the end of said driving shaft within said housing member, said housing member being fitted within annular receiving means provided by said hub portion to axially align said shafts and support the other of said shafts on said driving shaft, resilient sealing means interposed between the mating peripheries of said housing member and said hub portion, the axial dimension of contact of said receiving means and said member exceeding the axial dimension of said outer race, said radial portion extending inwardly beyond said outer race, said hub portion and said housing member defining a bearing lubricant-retaining cavity about said bearing means to prevent centrifuging of bearing lubricant therefrom upon rotation of said outer race.

9. An eddy current coupling comprising a housing and having relatively rotatable shafts journaled in the ends thereof, pilot bearing means for axially aligning said shafts comprising an inner race, an outer race and bearing elements therebetween, a bearing housing member having an annular portion extending axially with respect to said shafts and a radial portion with an opening defined therein to allow passage of one of said shafts therethrough, said outer race being non-rotatively mounted within said annular portion of said housing member, said inner race having an interference fit on the end of one of said shafts within said housing member, said housing member being fitted within receiving means provided by the other of said shafts to axially align said shafts, resilient sealing means interposed between said receiving means and said housing member, the axial dimension of contact of said receiving means and said member exceeding the axial dimension of said outer race to increase the surface contact therebetween, said radial portion extending inwardly beyond said outer race, said receiving means and said housing member defining a bearing lubricant-retaining cavity to prevent centrifuging of bearing lubricant therefrom upon rotation of said outer race.

10. An eddy current coupling comprising a housing having relatively rotatable shafts journaled in the ends thereof, pilot bearing means for axially aligning said shafts, comprising an inner race, an outer race and bearing elements therebetween aligning said shafts, a bearing housing member having an annular portion extending axially with respect to said shafts and a radial portion with an opening defined therein to allow passage of one of said shafts therethrough, said outer race being non-rotatively mounted within said annular portion of said housing member, said inner race having an interference fit on the end of one of said shafts within said housing member, said housing member being fitted within receiving means provided by the other of said shafts to axially align said shafts, resilient sealing means interposed between said receiving means and said housing member, the axial dimension of contact of said receiving means and said member exceeding the axial dimension of said outer race to increase the surface contact therebetween, said receiving means and said housing member defining a bearing lubricant-retaining cavity to prevent centrifuging of bearing lubricant therefrom upon rotation of said outer race, said radial portion of said housing member extending inwardly beyond said outer race and being radially dimensioned to predetermine the level of lubricant in the cavity upon rotation of said other shaft, a tube extending into the cavity beyond the predetermined level and communicating with a fitting accessible through an end wall of the coupling to allow introduction of lubricant into the cavity but prevent centrifuging of lubricant from the cavity through said tube and fitting.

11. A bearing mounting and lubricant-retaining arrangement for axially aligning two relatively rotating shafts comprising a bearing assembly having inner and outer races with bearing elements therebetween, a housing member having an annular portion extending axially with respect to said shafts and a radial portion defining an opening therein for passage of a shaft therethrough, said outer race being non-rotatively secured within the annular portion of said housing member, said inner race being secured on one of said shafts within the housing, closure means secured to the radial surface of said housing member on the side opposite said radial portion, lubricant-sealing means provided between said closure means and said housing member to prevent passage of bearing lubricant therethrough, said radial portion extending inwardly beyond said outer race, said closure means and said housing member defining a bearing assembly mounting cartridge having a lubricant-retaining cavity about said bearing assembly to prevent centrifuging of lubricant therefrom, said housing member being non-rotatively fitted within receiving means provided by the other of said shafts whereby said cartridge and bearing assembly axially align said shafts.

12. The arrangement of claim 11 wherein the sealing means are provided between said housing member and the receiving means.

13. A bearing arrangement comprising a bearing assembly having an inner race, an outer race and bearing elements therebetween, a rotatable shaft arranged to be carried on said outer race whereby the outer race rotates about the axis of the bearing assembly, an annular housing member extending axially with respect to the axis of said bearing assembly, said outer race being non-rotatively fastened within said annular housing member, said inner race being secured on a mounting member, said housing member being non-rotatively fitted into housing member receiving means provided by said shaft, said housing member having an annular portion extending inwardly beyond said outer race and together with said receiving means defining a lubricant-retaining cavity about said bearing assembly.

14. A bearing arrangement comprising a bearing assembly having an inner race, an outer race and bearing elements therebetween, a rotatable shaft arranged to be carried on said outer race whereby the outer race rotates about the axis of the bearing assembly, an annular housing member extending axially with respect to the axis of said bearing assembly, said outer race being non-rotatively fastened within said annular housing member, said inner race being secured on a mounting member, said housing member being non-rotatively fitted into housing member receiving means provided by said shaft, said housing member having an annular portion extending inwardly beyond said outer race and spaced from said bearing assembly and together with said receiving means defining a lubricant-retaining cavity about said bearing assembly, and means for preventing lubricant from centrifuging from said cavity between said housing member and said receiving means.

15. In combination with first and second axially aligned rotatable shafts, a bearing assembly having inner and outer rotating races with bearing elements therebetween for axially aligning said shafts; a housing member having an annular portion extending axially with respect to said shafts, said outer race being non-rotatively secured within said annular portion, said inner race being non-rotatively secured on one of said shafts, said housing member being non-rotatively fitted into housing member receiving means provided by the other of said shafts, said housing member having an annular portion extending inwardly beyond said outer race and together with said receiving means defining a lubricant-retaining cavity about said bearing, and means for preventing bearing lubricant from centrifuging from said cavity between said housing member and said receiving means.

16. In combination with first and second axially aligned rotatable shafts, a bearing assembly having inner and outer rotating races with bearing elements therebetween for axially aligning said shafts; a housing member having an annular portion extending axially with respect to said shafts, said outer race being non-rotatively secured within said annular portion, said inner race being non-rotatively secured on one of said shafts, said housing member being non-rotatively fitted into housing member receiving means provided by said other shaft, said housing member having an annular portion extending inwardly beyond said outer race and spaced from said bearing assembly and together with said receiving means defining a lubricant-retaining cavity about said bearing, and means for preventing bearing lubricant from centrifuging from said cavity between said housing member and said receiving means.

References Cited in the file of this patent

UNITED STATES PATENTS

| | | |
|---|---|---|
| 2,193,214 | Winther et al. | Mar. 12, 1940 |
| 2,324,676 | Butterfield | July 20, 1943 |
| 2,393,211 | Winther | Jan. 15, 1946 |
| 2,460,502 | Heintz | Feb. 1, 1949 |
| 2,509,775 | Libert | May 30, 1950 |
| 2,674,012 | Noelting | Apr. 6, 1954 |
| 2,723,168 | Carrol | Nov. 8, 1955 |
| 2,772,929 | Eastman | Dec. 4, 1956 |
| 2,872,257 | Brown et al. | Feb. 3, 1959 |
| 2,949,333 | Lesinski | Aug. 16, 1960 |